Figure 1:
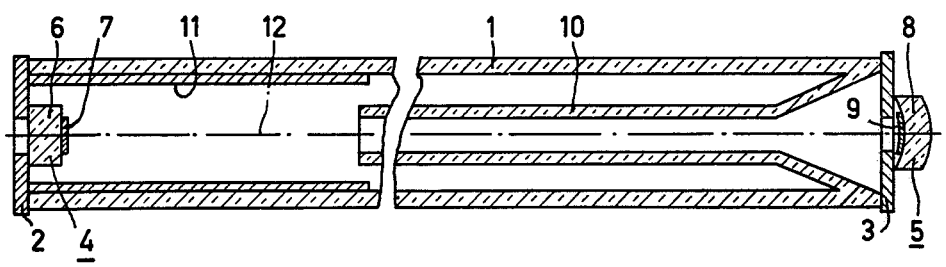

United States Patent [19]

van der Wal et al.

[11] 4,201,954
[45] May 6, 1980

[54] GAS DISCHARGE LASER FOR GENERATING LINEARLY POLARIZED RADIATION

[75] Inventors: Johannes van der Wal; Gijsbertus Bouwhuis, both of Eindhoven, Netherlands

[73] Assignee: U.S. Philips Corporation, New York, N.Y.

[21] Appl. No.: 907,554

[22] Filed: May 19, 1978

[30] Foreign Application Priority Data

Mar. 7, 1978 [NL] Netherlands ................... 7802454

[51] Int. Cl.² ............................................. H01S 3/08
[52] U.S. Cl. ................................ 331/94.5 C; 350/164; 350/166; 350/288
[58] Field of Search ............... 331/94.5 C; 350/164, 350/165, 166, 288, 147, 152

[56] References Cited

U.S. PATENT DOCUMENTS

| | | | |
|---|---|---|---|
| 4,009,453 | 2/1977 | Mahlein | 331/94.5 C |
| 4,009,933 | 3/1977 | Firester | 331/94.5 C |
| 4,084,883 | 4/1978 | Eastman et al. | 331/94.5 C |
| 4,132,959 | 1/1979 | Bouwhuis et al. | 331/94.5 C |
| 4,147,409 | 4/1979 | Apfel | 331/94.5 C |
| 4,152,673 | 5/1979 | Keijser et al. | 331/94.5 C |

*Primary Examiner*—William L. Sikes
*Attorney, Agent, or Firm*—Thomas A. Briody; William J. Streeter; Bernard Franzblau

[57] ABSTRACT

A gas discharge laser includes one or more birefringent layers in a multi-layer reflector that provides such a large difference in reflection of light polarized linearly in two mutually perpendicular directions that the laser generates 100% linearly polarized light in one direction only. In the other directions the reflection is insufficient to obtain stimulated emission.

3 Claims, 3 Drawing Figures

GAS DISCHARGE LASER FOR GENERATING LINEARLY POLARIZED RADIATION

The invention relates to a gas discharge laser for grnerating linearly polarized radiation, comprising a laser tube and a set of two reflectors the optical axis of which coincides with the axis of the laser tube, said reflectors being composed at least of a substrate on which a number of layers are provided which preferably have a quarter wavelength thickness and alternately consist of two dielectric materials having different indices of refraction, at least one of the said reflectors reflecting anisotropically.

Such a gas discharge laser is disclosed in U.S. Pat No. 4,152,673. As described in said patent, application, by applying a transverse magnetic field the direction of which is perpendicular to the axis of the laser tube, a linearly polarized light beam is obtained from the laser. By using in addition two anisotropic reflectors the directions of the anisotropy axis of which coincide substantially with the direction of the transverse magnetic field, a light beam is obtained from the laser having a very good polarization. The anisotropy axes of the reflectors are to be understood to mean the axes between which the difference in phase and/or intensity after reflection of light polarized linearly in the directions of said axes is maximum. For generating the transverse magnetic field a set of permanent magnets should be provided near the laser tube. Such a set of magnets for generating the transverse magnetic field is expensive and the alignment with respect to the reflectors requires extra operations. Moreover, the magnetic field may result in instabilities and noise in the gas discharge of the laser.

It is also known that lasers having a good linear polarization can be obtained by using a Brewster window in the laser. A problem in the construction of such a laser, however, is that very high requirements have to be imposed upon the optical quality of the Brewster windows, while in addition the efficiency of the laser will be smaller as a result of extra losses at said windows. Moreover, the provision of such windows is expensive and unfit for mass production.

It is known from U.S. Pat. No. 4,009,933 to provide irasers (infra-red lasers, for example $CO_2$ lasers) with a polarizing reflector. It consists of a substrate on which an electrically conductive and reflecting grid is provided. The spaces between the stripes of the grid are smaller than half the wavelength of the radiation to be reflected. It is obvious that such a reflector for a laser (for example a He—Ne laser having a wavelength of 6328 Å) cannot be manufactured or can be manufactured with extreme difficulty only.

It is therefore an object of the present invention to provide a linearly polarized gas discharge laser which does not require a magnetic field, in which the optical losses are small and with which a very good linear polarization of the laser beam is obtained.

According to the invention a gas discharge laser for generating linearly polarized radiation, comprises a laser tube and a set of two reflectors the optical axis of which coincides with the axis of the laser tube and which together constitute the laser resonator. The reflectors consist at least of a substrate on which a number of layers are provided which preferably have a quarter wavelength thickness and alternately consist of two dielectric materials having different indices of refraction, at least one of the said reflectors reflecting anisotropically. This gas laser is characterized in that at least one of the layers of the anisotropic reflector is so strongly anisotropic that the difference in reflection of the reflector for light polarized in two mutually perpendicular directions is at least 0.5%.

The birefringent layer or layers forms or form part of the set of reflecting layers of the reflector. By making at least one of the layers so strongly anisotropic that the reflection of the reflector is sufficient only in one direction to obtain stimulated emission, only a light beam polarized in that direction is generated by the laser. The advantages of such a laser for generating linearly polarized light with respect to an arbitrarily polarized laser with a polarizing filter behind it are the low losses and the very good linear polarization. If, in fact, a filter polarizing in one direction is placed behind or against a laser, the light generated by the laser and polarized in the remaining directions is lost. This is not the case in the present invention. The laser generates only linearly polarized light. Thus, the losses are much smaller.

The gas discharge laser according the the invention may be, for example, an Ar—, Kr— or He—Cd laser. However, it may alternatively be a laser to generate radiation having a much smaller wavelength, for example, a He—Ne—laser having a wavelength of 6328 Å. The dielectric materials of the layers of the reflector in a He—Ne laser are, for example, silicon dioxide ($SiO_2$) having an average index of refraction of 1.46 and titanium dioxide ($TiO_2$) having an average index of refraction of 2.21.

As already disclosed in the U.S. Pat. No. 4,152,673, the extent of anisotropy coincides with the direction of vapour deposition during the manufacture of the reflector. It has proved possible to make the layers having a high index of refraction so strongly anisotropic that the desired difference in reflection is obtained. This is possible by vapour-depositing said layers in such a manner that the depositing particles of material are incident obliquely. As a result of this it is possible to make the optical thickness for one direction of polarization approximately $\frac{1}{4}\lambda$, so that the layer reflects very readily, and to make the optical thickness for the other direction to be nearly $\frac{1}{2}\lambda$, so that the layer reflects poorly. The reflection of the whole reflector thus becomes anisotropic ($\lambda$ = the wavelength in the material of the layers).

Three of the layers of the anisotropic reflector having a higher index of refraction are preferably made to be so strongly anisotropic that the difference in reflection of said reflector for light polarized in two mutually perpendicular directions is at least 3%. In that case the layers for light polarized in one direction are approximately $\frac{1}{4}\lambda$ thick and have an optical thickness deviating therefrom in the direction extending at right angles thereto, so that the reflection in that direction is worse. In that case the laser is very stably linearly polarized.

A preferred embodiment is that in which the reflector is composed as follows: $S(H_{1,2}L)^x H L H$, wherein S is the substrate of the reflector, $H_{1,2}$ are birefringent layers having high indices of refraction, L are layers having a lower index of refraction, H are layers having a high index of refraction and x has the value 2, 3, 4 or 5.

Figure 2:
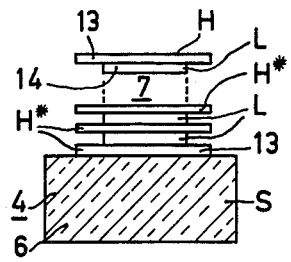
Figure 3:
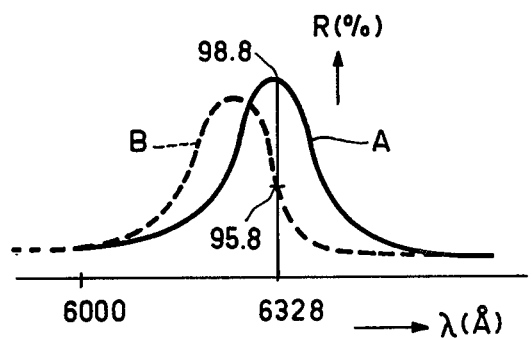

The invention will now be described in greater detail with reference to a drawing, in which:

FIG. 1 is a diagrammatic sectional view of a gas discharge laser according to the invention, FIG. 2 is a diagrammatic sectional view of the output reflector, and FIG. 3 shows the reflection as a function of the wavelength in two mutually perpendicular directions.

FIG. 1 is a diagrammatic sectional view of a polarized gas discharge laser according to the invention. This laser is composed of a tubular envelope 1, approximately 250 mm length, which is sealed at both ends by plates 2 and 3 which are each provided with an aperture. Plate 3 also constitutes the anode of the laser. Two reflectors 4 and 5 are provided on the plates 2 and 3 the optical axis of which coincides with the axis of the laser tube 10, which reflectors together constitute the laser resonator. The laser tube 10 has an inside diameter of 1.8 mm. A hollow cathode 11 is furthermore provided coaxially in the envelope. Reflector 4 constitutes the output reflector of the laser, that is the reflector through which the generated linearly polarized laser beam emanates. Reflector 5 is constructed as a concave reflector. The gas filling of the laser consists of 15% Ne and 85% He with a pressure of 2.3 torr. The output power of this laser is 1-2 mW at a wavelength of 6328 Å.

FIG. 2 is a diagrammatic sectional view of the reflector 4. Layers 14 of $SiO_2$ having a low index of refraction (L) of approximately 1.46 and layers 13 of $TiO_2$ having a higher index of refraction (H) of approximately 2.21 are provided alternately on a glass substrate 6 (S). By providing a number of the layers $TiO_2$ in such a manner that strongly birefringent layers are obtained, said reflector reflects light polarized only in one direction sufficiently to result in stimulated emission. As a result of this, 100% linearly polarized light is generated by the laser.

FIG. 3 shows the reflection R (in %) of a reflector having the birefringent layers shown in FIG. 2 as a function of the wave-length $\lambda$ (in Å). The solid line A indicates the reflection of light which is polarized linearly in a direction in which the optical thickness of the birefringent layers is $\frac{1}{4}\lambda$. The reflection at $\lambda = 6328$ Å is 98.8%, so that the laser generates light polarized in this direction. The broken line B indicates the reflection of light which is polarized linearly in a direction in which the optical thickness of the birefringent layers differs from $\frac{1}{4}\lambda$. The reflection at $\lambda = 6328$ Å in that case is 95.8%, which is insufficient to result in stimulated emission.

The invention will now be further described in greater detail with reference to a number of examples of lasers according to the invention.

EXAMPLE 1

A He—Ne gas discharge laser ($\lambda = 6328$ Å) of the construction described with reference to FIG. 1, is provided with an output reflector consisting of a glass substrate (S) on which $TiO_2$ layers (H), $SiO_2$ layers (L), $TiO_2$ layers ($H_{1,2}$) are provided. All the anisotropic layers have a thickness of $\frac{1}{4}$ wavelength for one direction of polarization. The layers were provided as follows:

| Number of the layer | 0 | 1 | 2 | 3 | 4 | 5 | 6 |
|---|---|---|---|---|---|---|---|

| Material | S | $H_{1,2}$ | L | $H_{1,2}$ | L | $H_{1,2}$ | L |
|---|---|---|---|---|---|---|---|
| Number of the layer | 7 | 8 | 9 | 10 | 11 | 12 | 13 |
| Material | $H_{1,2}$ | L | H | L | H | | |

This may be written in abbreviated form as follows:

$S(H_{1,2}L)^4 HLH.$

The index of refraction in two mutually perpendicular directions was for the $H_{1,2}$ layers $n_1 = 2.15$ and $n_2 = 2.25$. The difference in reflection R in these two directions thus became 1.2%. ($R_1 = 98.8\%$ and $R_2 = 97.6\%$). The difference in reflection thus is so large that a 100% linearly polarized light beam is generated by the laser.

EXAMPLE 2

A He—Ne gas discharge laser is provided with a reflector of the following form $S(H_{1,2}L) (HL)^4 H$ The birefringent layer $H_{1,2}$ has been vapour-deposited obliquely so that for one direction of polarization the layer is $\frac{1}{4}\lambda$ thick and for the direction at right angles thereto it is optically considerably thicker (for example $\frac{1}{2}\lambda$ thick). As a result of this the reflection $R_1$ in the first direction is 98.8% and the reflection $R_2$ in the other direction is 97%. Hence stimulated emission is possible only of light which is polarized linearly in the first direction.

What is claimed is:

1. A gas discharge laser for generating linearly polarized radiation, comprising a laser tube and a set of two reflectors the optical axis of which coincides with the axis of the laser tube, said reflectors being composed of at least a substrate on which a number of layers are provided which preferably have a quarter wavelength thickness and alternately comprise two dielectric materials having different indices of refraction, at least one of the said reflectors reflecting anisotropically, and wherein at least one of the layers of the anisotropic reflector is so strongly anisotropic that the difference in reflection of the reflector for light polarized in two mutually perpendicular directions is at least 0.5%.

2. A gas discharge laser as claimed in claim 1, wherein at least three of the layers of the anisotropic reflector are so strongly anisotropic that the difference in reflection of said reflector for light polarized in two mutually perpendicular directions is at least 3%.

3. A gas discharge laser as claimed in claim 2, wherein the reflector is composed as follows:

$S(H_{1,2}L)^x H L H,$ wherein
- S is the substrate of the reflector
- $H_{1,2}$ are birefringent layers having high indices of refraction
- L are layers having a lower index of refraction
- H are layers having a high index of refraction, and
- x has the values 2, 3, 4 or 5.

* * * * *